(12) United States Patent
Li et al.

(10) Patent No.: US 11,169,404 B2
(45) Date of Patent: Nov. 9, 2021

(54) BACKLIGHT MODULE WITH SEALANT COVERING GAPS AND DISPLAY DEVICE COMPRISING SAME

(71) Applicant: Wuhan China Star Optoelectronics Technology Co., Ltd., Wuhan (CN)

(72) Inventors: Shengming Li, Wuhan (CN); Jian Liu, Wuhan (CN)

(73) Assignee: Wuhan China Star Optoelectronics Technelogy Co., Ltd., Wahan (CN)

( * ) Notice: Subject to any disclaimer, the term of this patent is extended or adjusted under 35 U.S.C. 154(b) by 99 days.

(21) Appl. No.: 16/625,729

(22) PCT Filed: Sep. 29, 2019

(86) PCT No.: PCT/CN2019/108832
§ 371 (c)(1),
(2) Date: Dec. 22, 2019

(87) PCT Pub. No.: WO2021/003855
PCT Pub. Date: Jan. 14, 2021

(65) Prior Publication Data
US 2021/0263212 A1    Aug. 26, 2021

(30) Foreign Application Priority Data
Jul. 9, 2019    (CN) .......................... 201910613803.7

(51) Int. Cl.
*G02F 1/13357*    (2006.01)
*G02F 1/1333*    (2006.01)
*F21V 8/00*    (2006.01)

(52) U.S. Cl.
CPC ...... *G02F 1/133311* (2021.01); *G02B 6/0051* (2013.01); *G02B 6/0053* (2013.01); *G02B 6/0055* (2013.01); *G02B 6/0088* (2013.01); *G02B 6/0093* (2013.01); *G02F 1/133602* (2013.01); *G02F 1/133611* (2013.01)

(58) Field of Classification Search
CPC ............ G02B 6/0093; G02F 1/133311; G02F 1/133602
See application file for complete search history.

(56) References Cited

U.S. PATENT DOCUMENTS

| | | | | |
|---|---|---|---|---|
| 2013/0208510 A1* | 8/2013 | Takashima | .............. | G09F 13/04 362/615 |
| 2013/0263488 A1* | 10/2013 | Wu | ...................... | G02B 6/0088 40/773 |
| 2014/0125601 A1* | 5/2014 | Chen | ...................... | G06F 3/041 345/173 |
| 2020/0218102 A1* | 7/2020 | Wei | ...................... | G02F 1/1339 |
| 2021/0080771 A1* | 3/2021 | Tezen | ..................... | H05K 1/189 |

FOREIGN PATENT DOCUMENTS

CN    204922672 U    * 12/2015

* cited by examiner

*Primary Examiner* — Keith G. Delahoussaye

(57) ABSTRACT

The disclosure provides a backlight module and a display device. The backlight module includes an outer housing, wherein the outer housing includes a first housing and a second housing vertically connected to a periphery of the first housing. The first housing and the second housing encircle to form a cavity. The backlight module further includes a first brightness enhancement film (BEF) disposed on the cavity, wherein the first BEF extends to the second housing. A lateral side of the first BEF near the first housing is aligned with an outer side of the second housing.

15 Claims, 2 Drawing Sheets

BACKLIGHT MODULE WITH SEALANT COVERING GAPS AND DISPLAY DEVICE COMPRISING SAME

RELATED APPLICATIONS

This application is a National Phase of PCT Patent Application No. PCT/CN2019/108832 having International filing date of Sep. 29, 2019, which claims the benefit of priority of Chinese Patent Application No. 201910613803.7 filed on Jul. 9, 2019. The contents of the above applications are all incorporated by reference as if fully set forth herein in their entirety.

FIELD AND BACKGROUND OF THE INVENTION

The present disclosure relates to the display field and, more particularly, relates to a backlight module and a display device.

Backlight modules, as a lighting source of liquid crystal displays (LCDs), are fixed on a backside of the LCDs. Luminous effect of the backlight modules directly affects visual effect of the LCDs. With development of technology, market demand for the LCDs as well as for the backlight modules becomes higher and higher.

The backlight modules can be classified into edge type backlight modules and direct type backlight modules, based on an arrangement of lighting sources within the backlight modules. The lighting source of the direct type backlight modules is mounted on a bottom plate which is parallel to a panel, and light is directly emitted from a bottom. Lighting source of the edge type backlight modules is mounted on a lateral frame of a panel, and light is emitted from the panel after being refracted by a light guide plate. Compared to the edge type backlight modules, the direct type backlight modules have advantages such as wider color gamut, more natural image effect, more uniform brightness on panel, and less light leakage of panel. Furthermore, the direct type backlight modules can improve contrast to achieve dynamic intelligent backlight, which enables the direct type backlight modules to have better image quality.

A screen-to-body ratio of a visual area of the backlight modules is an important parameter to measure quality of the backlight modules. The screen-to-body of the visual area is a ratio of an area of the visual area of a backlight module to an area of the entire backlight module.

A conventional way to increase the screen-to-body ratio of the visual area is removing light-shading glue from two sides of the backlight module. Diaphragms are assembled in a metal frame. To prevent light leakage from a left side and a right side of a backlight module, which do not have the light-shading glue after the backlight module is formed, a hot melt adhesive or an ultraviolet adhesive is usually coated on the left side and the right side of the backlight module. However, the conventional way has the following defects:

Firstly, because the left side and the right side of the backlight module do not have the light-shading glue, foreign matter is prone to enter the backlight module during processes of transportation and assembly, which results in problems such as white spot, black spot, and scratch on the diaphragms.

Secondly, a thickness of the metal frame is usually only 0.1 mm after an adhesive is coated on lateral sides of the backlight module. A 0 to 0.05 mm gap usually exists between the metal frame and glass. Therefore, the adhesive is prone to overflow into the backlight module, which reduces the gap, leading to waving during temperature and humidity test. An overflowed adhesive is prone to leak into a display region and seriously affect image quality during a drop test.

SUMMARY OF THE INVENTION

To solve the above technical problem, the present disclosure provides a backlight module and a display device to solve the light leaking problem caused by the conventional technology that removes light-shading glue on two sides of the backlight module to increase the screen-to-body ratio of the visual area.

Regarding the technical solution, the present disclosure provides a backlight module, including: an outer housing, wherein the outer housing includes a first housing and a second housing vertically connected to a periphery of the first housing, and the first housing and the second housing encircle to form a cavity; and a first brightness enhancement film (BEF) disposed on the cavity, wherein the first BEF extends to the second housing, and a lateral side, which is near the first housing, of the first BEF is aligned with an outer side of the second housing.

Furthermore, the backlight module further includes a reflective film disposed on the first housing; a light guide plate disposed on a side of the reflective film away from the first housing; a diffuser disposed on a side of the light guide plate away from the reflective film; and a second BEF disposed between the diffuser and the first BEF; wherein the reflective film, the light guide plate, the diffuser, and the second BEF are disposed in the cavity.

Furthermore, a first gap is defined between the first BEF and the second housing, and a sealing adhesive is disposed in the first gap.

Furthermore, the sealing adhesive is an opaque elastic adhesive.

Furthermore, the outer housing is a metal housing.

Furthermore, a second gap is defined between the reflective film and the second housing and is defined between the second BEF and the second housing.

The present disclosure further provides a display device, including the backlight module.

Furthermore, the display device further includes a display panel disposed on a side of the backlight module, wherein the display panel is disposed on a same side as the first BEF, and a third gap is defined between the display panel and the first BEF; a plate glass disposed on a side, which is away from the backlight module, of the display panel; and a sealant for encapsulating the display panel, the backlight module, and the plate glass.

The sealant covers the first gap defined between the first BEF and the second housing. The sealant adhesive covers the third gap and extends to the third gap to form a supporting layer.

Furthermore, the display device further includes an optically clear adhesive disposed between the plate glass and the display panel.

Regarding the beneficial effects: In a structure of the backlight module and the display panel provided by the present disclosure, an uppermost diaphragm of the backlight module is extended, and an elastic adhesive is coated on a bottom surface of the uppermost diaphragm to bond the uppermost diaphragm to a frame, thereby isolating the backlight module from outside environment, and preventing foreign matter from entering the backlight module during transportation and assembly processes, which results in problems of white spot, black spot, and scratch on diaphragms. When adhesive is applied to the backlight module, an overflowed adhesive will only leak in a place between a display panel of the uppermost diaphragm and a periphery of the backlight module and will not affect inner diaphragms of the backlight module and a light guide plate. When the backlight module drops, the whole overflowed adhesive is not easy to peel, thereby preventing waving during temperature and humidity test. A problem that the overflowed adhesive is prone to leak into a display region and seriously affect image quality during a drop test is solved.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

Figure 1:
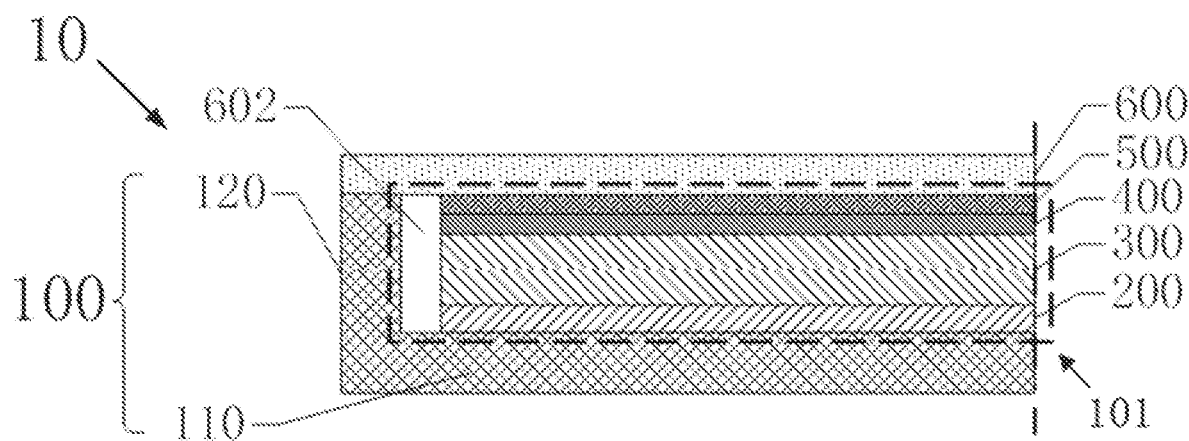
FIG. 1 is a schematic view showing a backlight module according to a first embodiment.

The following description of the various embodiments is provided with reference to the accompanying drawings. It should be understood that terms such as "upper", "lower", "front", "rear", "left", "right", "inside", "outside", "clockwise", "lateral", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

First Embodiment

As shown in FIG. 1, in the present embodiment, a backlight module 10 provided by the present disclosure includes an outer housing 100, a reflective film 200, a light guide plate 300, a diffuser 400, a second brightness enhancement film (BEF) 500, and a first BEF 600.

The outer housing 100 is a metal housing, including a first housing 110 and a second housing 120. The second housing 120 is vertically connected to a periphery of the first housing 110. The first housing 110 and the second housing 120 encircle to form a cavity 101.

In the present embodiment, the backlight module 10 is a direct type backlight module, which emits light from its bottom. The direct type backlight module has advantages such as wider color gamut, more natural image effect, better uniform brightness on panel, and less light leakage of panel. Furthermore, contrast of the direct type backlight module can be improved to achieve dynamic intelligent backlight. The reflective film 200 is disposed in the cavity 101 and contacts the first housing 110. The reflective film 200 is configured to refract light emitted toward a direction of the first housing 110 in a direction away from the first housing 110, thereby improving luminous efficiency of the backlight module 10.

The light guide plate 300 is disposed on a side of the reflective film 200 away from the first housing 110. The light guide plate 300 includes a light-emitting side and a light-incident side. In the present embodiment, because the backlight module 10 is a direct type backlight module, the light-emitting side and the light-incident side are symmetrically disposed on two sides of the light guide plate 300. Therefore, light emitted from a lighting source can be refracted, which makes an integrated light softer.

The diffuser 400 is disposed on a side of the light guide plate 300 away from the reflective film 200. That is, the diffuser 400 is disposed on the light-emitting side of the light guide plate 300. Light emitted from the light guide plate 300 can further be scattered by a structure of the diffuser 400.

The second BEF 500 is disposed on the diffuser 400. Inevitably, light emitted from the lighting source will be affected after being refracted by the light guide plate 300 and the diffuser 400. The second BEF 500 can integrate light, thereby improving intensity of light passing through the second BEF 500.

To ensure luminous efficiency of the backlight module 10, a second gap 602 is defined between the reflective film 200 and the second housing 120, as well as between the second BEF 500 and the second housing 120.

The first BEF 600 is disposed on the second BEF 500. Principle and effect of the first BEF 600 are similar to that of the second BEF 500. In a conventional technology, light-shading glue is removed from a left side and a right side of the backlight module to increase a screen-to-body ratio of a visual area. Furthermore, a gap exists between a reflective film, BEF, and an outer housing, so foreign matter is prone to enter the backlight module during transportation and assembly processes, which results in problems of white spot, black spot, and scratch on diaphragms.

In the present embodiment, the first BEF 600 extends onto the second housing 120. A lateral side, which is near the first housing 110, of the first BEF 600 is aligned with an outer side of the second housing 120, which can not only increase a screen-to-body ratio of a visual area, but also prevent foreign matter from entering the backlight module 10.

Figure 2:
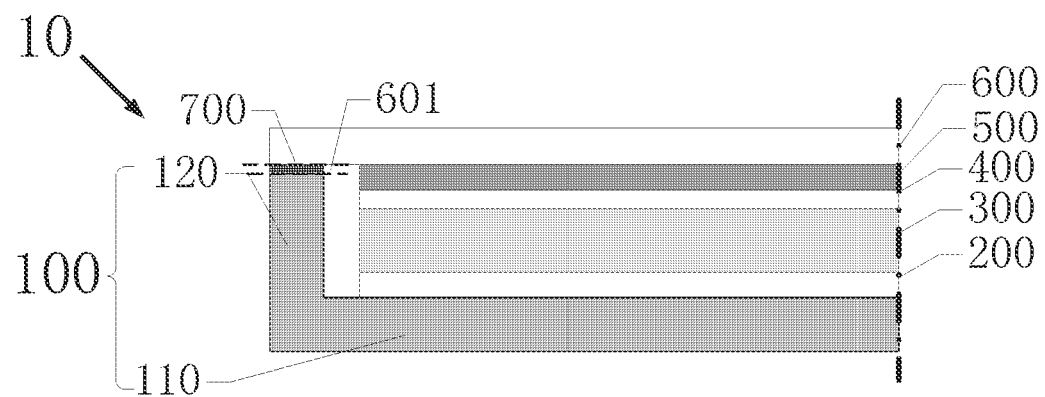
FIG. 2 is a schematic view showing another backlight module according to the first embodiment.

As shown in FIG. 2, in another embodiment of the present disclosure, a first gap 601 is defined between the first BEF 600 and the second housing 120 to prevent foreign matter from entering the backlight module 10. A sealing adhesive 700 is disposed in the first gap 601. The sealing adhesive 700 is an opaque elastic adhesive with sealing and light-blocking functions.

Second Embodiment

Figure 3:
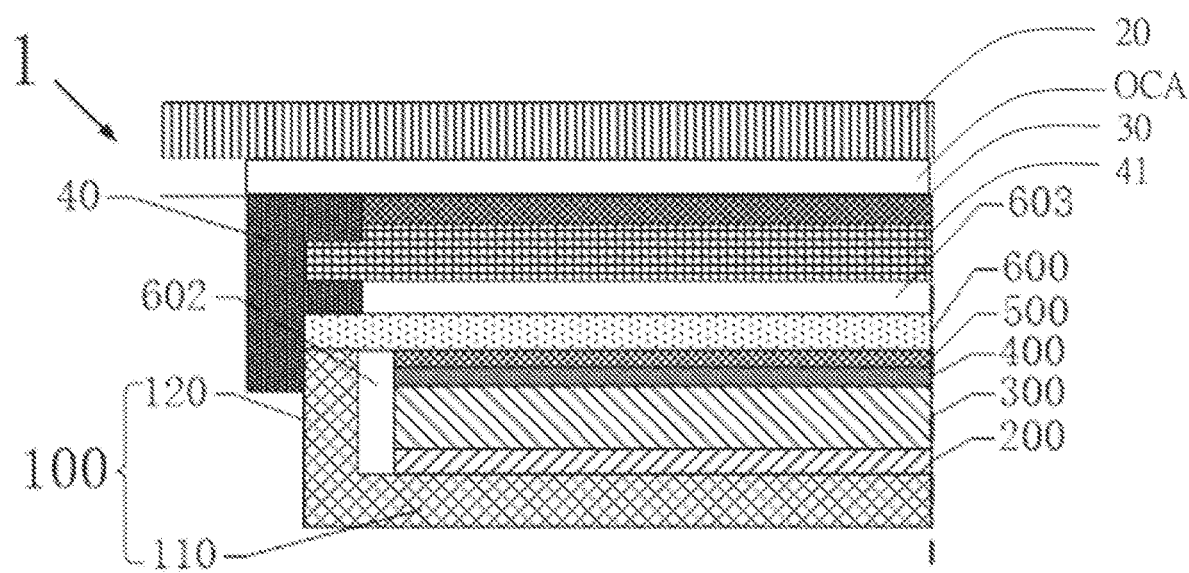
FIG. 3 is a schematic view showing a display device according to a second embodiment.
Figure 4:
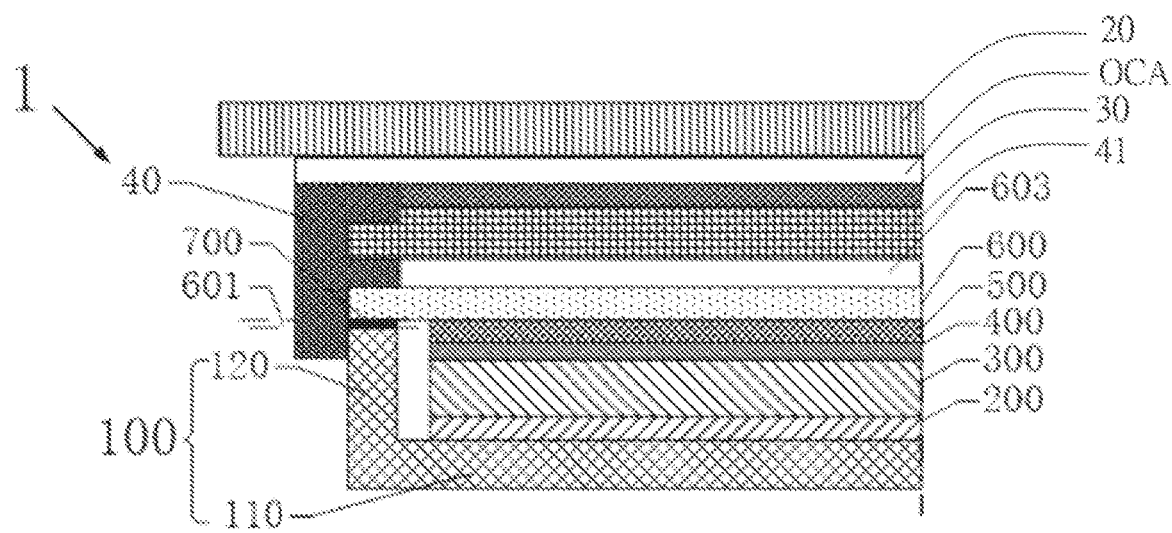
FIG. 4 is a schematic view showing another display device according to the second embodiment.

As shown in FIG. 3 and FIG. 4, in the present embodiment, a display device 1 provided by the present disclosure uses the backlight module 10 of the first embodiment. The display device 1 further includes a plate glass 20, an optically clear adhesive (OCA), a display panel 30, and a sealant 40.

The display panel 30 is disposed on the backlight module 10. A third gap 603 is defined between the display panel 30 and the backlight module 10. The backlight module 10 provides lighting source for the display panel 30 to display images.

The plate glass 20 is disposed on a side of the display panel 30 away from the backlight module 10, thereby protecting the display panel 30 and preventing the display panel 30 from being polluted or scratched by foreign matter.

The sealant 40 is a hot melt adhesive or an ultraviolet adhesive and is used to encapsulate the display panel 30, the backlight module 10, and the plate glass 20. Specifically, the sealant 40 covers the first gap 601 between the first BEF 600 and the second housing 120. The sealant 40 further covers the third gap 603 and extends to the third gap 603 to form a supporting layer 41.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A backlight module, comprising:
   an outer housing, wherein the outer housing comprises a first housing and a second housing vertically connected to a periphery of the first housing, and the first housing and the second housing encircle to form a cavity; and
   a first brightness enhancement film (BEF) disposed on the cavity, wherein the first BEF extends to the second housing, and a lateral side, which is near the first housing, of the first BEF is aligned with an outer side of the second housing.

2. The backlight module of claim 1, wherein the backlight module further comprises:
   a reflective film disposed on the first housing;
   a light guide plate disposed on a side of the reflective film away from the first housing;
   a diffuser disposed on a side of the light guide plate away from the reflective film; and
   a second BEF disposed between the diffuser and the first BEF;
   wherein the reflective film, the light guide plate, the diffuser, and the second BEF are disposed in the cavity.

3. The backlight module of claim 1, wherein a first gap is defined between the first BEF and the second housing, and a sealing adhesive is disposed in the first gap.

4. The backlight module of claim 3, wherein the sealing adhesive is an opaque elastic adhesive.

5. The backlight module of claim 1, wherein the outer housing is a metal housing.

6. The backlight module of claim 2, wherein a second gap is defined between the reflective film and the second housing and is defined between the second BEF and the second housing.

7. A display device, wherein the display device comprises the backlight module of claim 1.

8. The display device of claim 7, wherein the display device further comprises:
   a reflective film disposed on the first housing;
   a light guide plate disposed on a side of the reflective film away from the first housing;
   a diffuser disposed on a side, which is away from the reflective film, of the light guide plate; and
   a second BEF disposed between the diffuser and the first BEF;
   wherein the reflective film, the light guide plate, the diffuser, and the second BEF are disposed in the cavity.

9. The display device of claim 7, wherein a first gap is defined between the first BEF and the second housing, and a sealing adhesive is disposed in the first gap.

10. The display device of claim 9, wherein the sealing adhesive is an opaque elastic adhesive.

11. The display device of claim 7, wherein the outer housing is a metal housing.

12. The display device of claim 8, wherein a second gap is defined between the reflective film and the second housing and is defined between the second BEF and the second housing.

13. The display device of claim 9, wherein the display device further comprises:
   a display panel disposed on a side of the backlight module, wherein the display panel is disposed on a same side as the first BEF, and a third gap is defined between the display panel and the first BEF;
   a plate glass disposed on a side, which is away from the backlight module, of the display panel; and
   a sealant for encapsulating the display panel, the backlight module, and the plate glass;
   wherein the sealant covers the first gap defined between the first BEF and the second housing; and
   wherein the sealant covers the third gap and extends to the third gap to form a supporting layer.

14. The display device of claim 13, wherein the display device further comprises an optically clear adhesive disposed between the plate glass and the display panel.

15. The display device of claim 14, wherein material of the sealant is a hot melt adhesive or an ultraviolet adhesive.

* * * * *

UNITED STATES PATENT AND TRADEMARK OFFICE
CERTIFICATE OF CORRECTION

PATENT NO. : 11,169,404 B2  
APPLICATION NO. : 16/625729  
DATED : November 9, 2021  
INVENTOR(S) : Shengming Li et al.

Page 1 of 1

It is certified that error appears in the above-identified patent and that said Letters Patent is hereby corrected as shown below:

On the Title Page

Item (73) Assignee:
"Wuhan China Star Optoelectronies Technelogy Co., Ltd., Wahan (CN)"
Should be changed to:
--Wuhan China Star Optoelectronics Technology Co., Ltd., Wuhan (CN)--

Signed and Sealed this
Seventeenth Day of May, 2022

Katherine Kelly Vidal
*Director of the United States Patent and Trademark Office*